United States Patent [19]

Donath et al.

[11] 4,209,782

[45] Jun. 24, 1980

[54] METHOD AND CIRCUIT ARRANGEMENT FOR THE ELECTRONICALLY CONTROLLED RELEASE OF DOOR, SAFE AND FUNCTION LOCKS USING ELECTRONICALLY CODED KEYS

[75] Inventors: Norbert W. Donath; Bernhard K. Donath, both of Munich, Fed. Rep. of Germany

[73] Assignee: Maximilian Wachtler, Sierksdorf, Fed. Rep. of Germany

[21] Appl. No.: 941,216

[22] Filed: Sep. 11, 1978

Related U.S. Application Data

[63] Continuation-in-part of Ser. No. 821,808, Aug. 4, 1977, abandoned.

[30] Foreign Application Priority Data

Aug. 5, 1976 [DE] Fed. Rep. of Germany ....... 2635180

[51] Int. Cl.[2] ......................... E05B 49/00; H04Q 9/00

[52] U.S. Cl. ............................... 340/147 MD; 70/278

[58] Field of Search ....... 340/147 MD, 149 R, 149 A, 340/164 R; 70/278

[56] References Cited

U.S. PATENT DOCUMENTS

| | | | |
|---|---|---|---|
| Re. 29,259 | 6/1977 | Sabsay | 340/149 A |
| 3,800,284 | 3/1974 | Zucker et al. | 340/149 R |
| 3,848,229 | 11/1974 | Perron et al. | 340/149 R |
| 3,859,634 | 1/1975 | Perron et al. | 340/149 R |
| 3,944,916 | 3/1976 | France et al. | 340/149 A |
| 4,048,475 | 9/1977 | Yoshida | 340/149 A |

*Primary Examiner*—Donald J. Yusko
*Attorney, Agent, or Firm*—James E. Nilles

[57] ABSTRACT

A safety system comprising closure means, hereinafter termed locks, and associated closure release means, hereinafter termed keys, which operate electronically and which grant access. The lock release is dependent on the agreement or coincidence of a variable lock/key code pair. Random codes are employed which are altered either automatically each time a lock is actuated or only as required. A plurality of locks can be actuated by a common key which possesses another variable code for each lock. In addition, a plurality of keys can actuate a common lock which possesses another variable code for every key. Both possibilities can be combined, since every key and every lock possesses another associated code pair whose association is automatically produced when a lock is actuated. By means of a central key which is safeguarded in the same manner, the user can produce and vary any desired lock/key association so as to eliminate misuse. All keys and locks operate independently of one another and do not require any coordination center. Lost keys can be made immediately from standardized keys with the aid of the central key, the lost key being automatically blocked or eliminated. Moreover, the central key permits the user to correct malfunctions of the key or lock fits. Disturbances or malfunctions of the system or the loss of the central key are not critical, since in such a case an emergency code known only to the manufacturer or an authorized safety official can be read into the affected locks either automatically or manually triggered. Since no key contains the emergency code and since this can be different for every lock, there is no restriction of safety. Auxiliary measures are included which prevent the respective key code from unfortunately being read out of the apparatus. The different users can also be automatically identified or, if desired, registered automatically with the aid of the employed code association. This also prevents misuse. Time-outs and similar safeguards can also be included in the system.

34 Claims, 11 Drawing Figures

METHOD AND CIRCUIT ARRANGEMENT FOR THE ELECTRONICALLY CONTROLLED RELEASE OF DOOR, SAFE AND FUNCTION LOCKS USING ELECTRONICALLY CODED KEYS

REFERENCE TO RELATED CO-PENDING APPLICATION

This is a continuation-in-part of application Ser. No. 821,808, filed Aug. 4, 1977 and now abandoned.

BACKGROUND OF THE INVENTION

In the present state of the art closure systems with a plurality of locks require a coordination center which stores all valid codes of all locks so that they can be called up selectively, which exchanges varied codes and which executes all coordination work which occurs. Passive keys, e.g. in the form of puched cards, are used advantageously. They are coded in the center. The center must consequently communicate or be in contact with the individual locks, which normally requires expensive installations between the coordination center and the various locks which are susceptible to intervention by force. While searching for remedies, methods have been found which omit the above-mentioned installations by executing the necessary exchange of data between the center and the locks by way of the keys which are employed. Such a method is disclosed in U.S. Pat. No. 3,800,284. It permits the respective valid code to be varied through the coordination center at arbitrarily chosen times. If such an alteration is to be performed, the coordination center produces a newly coded key for the respective lock. The key code has been derived from the hitherto valid key code with the aid of a pseudo random generator. If the actuated lock logic circuit now recognizes that the key code being offered corresponds to the hitherto valid lock code which has been modified in the same way on the lock side, it accepts this and assumes it to be the new lock code, thus enabling this key to still fit the lock, while the hitherto proper key has been blocked or eliminated due to the change in the lock code.

Another similar method is recited in U.S. Pat. No. Re 29,259 which has the same object and accomplishes this in a similar manner. The essential difference is that in this case the key contains two different codes, an authorization code and a key code. According to which of the two codes present on the key side coincides with the respective lock code, the lock is only opened or it also uses the offered authorization code as the future valid lock code. In this case as well, the appropriate coding of a key determines whether or not the lock code is to be altered to block the hitherto proper key. The advantages over the first above-mentioned process are quite obvious: true random codes can be used for recoding and the lock logic circuit does not require a pseudo random generator. In both methods the use of additional keys is provided, each of them fitting a plurality of locks (e.g. personnel keys in hotels). In such expanded systems, keys and/or locks possess additional codes which must be evaluated in the same manner.

Compared to the instant invention, the above methods demonstrate the following essential differences. A relatively expensive stationary coordination central is required for the coordination work. The center can be misused, since it is not safeguarded. It requires all valid lock codes. Disruptions or malfunctions, e.g. due to memory break-down or erroneous codes on the lock side, cannot be corrected at all in the one system and only with difficulty in the other one. The codes cannot be changed automatically every time the key is used. Keys which have access to a plurality of locks have the same codes for these locks. This means a restriction of the safety of the system and a problematical change of key/lock associations.

A second group of methods does not necessitate any coordination center. They advantageously employ active electronic keys which have their own reprogrammable memories, e.g. IC shift registers or core memories, to receive and intermediately store variable codes. Such methods make it possible to change the valid lock/key code at any time during a key contact with a lock so that it is possible to automatically alter the valid codes every time the lock is actuated. Such measures enhance the safety of the system considerably. What is problematical, however, is the coordination of a plurality of such keys for a common lock or the execution of other tasks which are relatively easy to solve with the aid of a center such as, for example, the replacement of lost or stolen proper keys, the elimination of erroneous codes, the change of key/lock associations etc. A method of the second group is dislcosed in the associated U.S. Pat. No. 3,848,229 and 3,859,634. Of the aforequoted problems associated with this group of methods, only one is solved at the expense of free code changes: the coordination of a plurality of keys for a common lock. Individual code sites are combined according to an established scheme from a binary code present on the lock side (partial codes) and respectively associated with a key. The number of partial codes of a lock determines the number of auxiliary or additional keys employed. Identical partial codes of different locks can be actuated by the same key. The consequence is that the safety of the system is restricted, the codes can no longer to chosen arbitrarily, and automatic code changes cannot be realized according to a random or pseudo random law. The safety measures given for this method and designed to prevent valid key codes from being read out and to serve automatic user identification are easy to circumvent unlike the corresponding measures in the instant invention.

Another method in the second group, which incidentally operates only with pseudo random combinations, is disclosed in U.S. Pat. No. 3,944,976. Of the problems of this method group mentioned at the outset, this method only solves the coordination of a plurality of keys for one common lock (or vice-versa) this time at the expense of operational comfort, since the lock/key association must be executed manually on the key before the key is used. The key/lock association produced in this manner ensures that of a plurality of codes stored on the lock side only the one code chosen by the association will be processed. The coincidence examination is made for all codes. If one of them coincides with the offered key code, this is sufficient to release the lock. The consequence is that operation is cumbersome, errors in operation can also block other keys, every lock requires a differently constructed key receptacle and, since there is no selective code examination, the safety of the system is restricted.

Methods of the second group have the following essential differences as compared to the instant invention. The use of a plurality of keys for one common lock (or vice-versa) is conductive to a restriction of the safety of the system and, in addition, to the omission of arbitrarily selectable or automatically changing codes or operational difficulties in addition to a possible impairment of other users. The lock/key associations cannot be varied without intervention. An undesirable blocking of an originally proper key, for instance due to a contact interruption during data exchange, cannot be eliminated or corrected without intervention. If a proper key is lost, a proper replacement cannot be manufactured by the user. Interventions in the respective lock circuits are required to block the lost key. The system can be tricked by overloading the active memory arrays of the lock and keys, e.g. by overheating, so that they are energized in technologically-induced preferential positions (smoothed codes) which trigger release by virtue of the code coincidence achieved in this way.

Finally, other differences are mentioned which both method groups include as compared to the instant invention. New lock and key codes are not corrected if the codes are erroneous. The undesirable duplication of a key is not prevented at all or only poorly. User identification does not exist or it can be faked. If the system malfunctions, e.g. if the lock memory is erased, the safety of the system works against the user.

SUMMARY OF THE INVENTION

The instant invention relates to a safety system comprising one or more electronically controlled locks, associated active keys and a central key. The connection of a key to a lock can be effected by establishing contacts, inductions, opto-electrical contacts or the like. The release of a lock is dependent on the coincidence of a variable key/lock code pair. The code pair can be changed as required or automatically every time the lock is actuated. A plurality of keys and a plurality of locks can be combined arbitrarily, since another memory cell pair is provided for each lock/key association. By virtue of the existant electronically stored key number and lock number, the appropriate lock and key memory cells are selectively called and their contents compared during a closure operation. If there is coincidence, a new coinciding code pair is automatically produced with the aid of a random generator and registered in the respective memory cells in place of the hitherto valid pair. The new code pair can be compared once again and, if there is non-coincidence, can be corrected before the lock is released. The lock/key associations are produced and changed with the aid of the central key which functions like any other key, but is unlike the rest of the keys due to an electronically applied marking, e.g. a very special key number. If the electronic lock circuit determines from this marking that a proper central key is being used, it causes a brief reorganization of the coding means on the lock side by rendering a subsequently used key, if it is improper, proper by reading in a coinciding code pair, or if it is proper, improper by reading in a non-coincidant code pair. In another variation, the central key can be omitted and a secret code used in its place which is introduced into the key which is to be rendered proper. If this is used, the electronic lock circuit is energized in a state which is triggered normally with the aid of the proper central key.

So that the safety of the system cannot be directed against the user in the event of malfunctions of the system, e.g. if the lock memory is erased, measures are taken which ensure that an emergency code known only to the manufacturer or authorized security official is introduced into the respective lock memory cell either automatically or manually programmable, e.g. if the central key is lost. This makes it possible to solve such disruptions or malfunctions without hardware intervention. Since no key contains the emergency code and since this can be different for each lock, the safety of the system is not restricted. The emergency code can also be altered if required and, if desired, taken from a separate source. In addition, a method is aos stated which cannot be misused and which prevents the undesirable read-out of the valid key code. Users can also be identified as well so as to prevent misuse of the system.

In contradistinction to the known methods cited at the outset it is possible for the user to arbitrarily vary the lock/key associations by means of the central key so as to eliminate misuse, to re-establish the proper fit of a key, and to manufacture a proper replacement key from a standardized key, whereupon the lost key is automatically blocked. Safeguards are provided which prevent the system from being tricked, since the lock release will not be actuated, even if smoothed codes exist. If there are erroneous codes, the new code is automatically re-established, if desired several times, until the codes coincide. Only then will the signal to release the lock be triggered. The safeguards which prevent a duplicate key from being used cannot be circumvented. The same applies as well to the user identification. In the event of malfunction in the electronic lock circuit, an emergency code which is automatically or manually triggered ensures that this does not restrict the safety of the system nor can it be directed against the user.

The object of the invention is to provide a method of the type cited at the outset and to improve a circuit arrangement for lock/key means or comparable means with a locking function in a general sense with respect to the known systems by being able to vary the code triggering the release depending on its use without requiring a coordination center and in which it is also possible for the user to establish or eliminate repeatedly the fitting function of a proper or improper key by using a central key or an information medium which acts in the sense of a "central key". Further objects of the invention are to improve the method by taking measures which make it possible in case of internal disruptions as well as in case of predictable danger of misuse not to trigger on the one hand any undesirable release of the means which are locked with respect to the existing key or, when the central key is used, not to trigger the release of the function to make another key fit. On the other hand, the manufacturer or authorized persons should be given the possibility of eliminating such blockages with reverting to violence or force and, if the cause was the danger of misuse, to continue to eliminate this danger, to reduce the danger of misuse itself by making it impossible to copy such keys by using a special key code. "KEYS" are to be understood in this context as functionally corresponding means as well.

This object is accomplished in accordance with the invention by means of a method which is characterized in that the variable binary code to be stored temporarily in the lock and key until their next use are produced directly by a random or pseudo-random generator, that when a key is reused a new coinciding lock/key code produced in the same manner when coincidence of the lock and key codes exists is stored instead of the original code and the lock is thereafter released, and that while exclusively using a proper central key after the previous detection of the coincidence of a code with the lock code associated therewith functions are actuated within the lock electronic system by means of which either an improper key to be coupled to the lock electronic system can be made to fit by storing a new coinciding code and/or a proper key to be coupled to the lock electronic system is rendered improper by producing and storing a non-coinciding code.

With the aid of a proper central key, a user can produce proper keys from initially improper standardized keys at any time without requiring any extra time and at no additional expense. Hence, if a key is lost, a fully adequate replacement key can easily be produced without difficulty. At the same time, the lost key is eliminated from the system. Thus, the interventions in the hardware in the respective lock means which were usually necessary if a key was lost can also be omitted as well. Coding errors, e.g. due to contact dirt which necessarily results in the blockage of a proper key can now be eliminated by the use with the aid of the central key. Since the proper central key required for all cited functions is ensured in the same manner as the other keys, misuse is practically impossible. Since the key code can be executed by the user himself, preferably standardized keys are required which can be put on the market without any safety precautions, e.g. by the retail trade.

It must be possible to examine the central key on the lock side both with respect to its central key properties, as well as to its fitting function and to erase the functions in the lock electronic system only upon positive identification, by means of which the fitting function of a provided proper or improper key is eliminated or produced. The necessary coupling of the central key to the respective lock means can be effected via an additionally provided key fitting. The key whose fitting function is to be varied is then inserted into the key fitting which is otherwise used as well. Another solution which only requires a key fitting provides that the central key is to be inserted initially into it, which after positive identification releases the above-cited function reversal on the lock side briefly via a time stage, e.g. a monostable flip-flop stage so that the key to be exchanged for the central key can be changed as far as its fitting function is concerned.

In order to be able to extensively eliminate coding errors, the release in accordance with the invention can be actuated after the new coding only if a comparator assembly has reported the coincidence of the new code combinations written in the associated lock and key memory cells. If there is non-coincidence, the random or pseudo-random generator replaces these code combinations by two new coinciding code combinations until the comparator stage reports coincidence of the code combinations.

According to the design of the inventive method, the respective change in the variable lock and key code occurs automatically during every use or only after being triggered manually. The latter would be the case, for example, if the code changes when eliminating a correspondingly designed lock can only be made if a double block is made by one successive rotation with the aid of the key or only if the central key is used simultaneously. So that the undesirable search for a valid code by systematically "trying", e.g. by using a counter means supplying the codes, is thwarted, a time stage, e.g. a monostable flip-flop stage is provided in the lock electronic system which is always set with the aid of the comparator signal which reports the non-coincidence of the codes when a non-proper code was offered on the key side, The triggered flip-flop signal prevents the evaluation of other subsequently offered codes for the duration of its existence. Furthermore, it can be used for the alarm output.

Both a plurality of locks as well as a plurality of keys with an arbitrary association can be used in an advantageous manner. The use can also manufacture and even change the desired associations at any time subsequently without any outside help using the central key. Another variable code would then be responsible for every lock/key combination. This is achieved in that the memories containing in the lock and key to receive the code consist of a plurality of addressable memory cells, each of which is capable of receiving another code combination. Each lock and each key possesses a mechanically or electronically stored individual code number. A solution to the selective storage cell selection consists in that the code number of a lock constitutes the same constant address of the associated memory cells of all permissable keys, and that the code number of a key constitutes the same constant address of the associated memory cells of all permissible locks. Each lock/key combination would thus be associated with another pair of memory cells which is automatically recelled during each use. It is understood to be self-evident that no more locks or keys can be provided within one "family" than there are available memory cells per memory.

A key can also obtain access to a plurality of "families" only if it is ensured that the code number thereof is not already used in any of the respective families. This restriction can be disadvantageous if such door, safe and function locks should have gained acceptance. In such a case, it would be meaningful to make available to the user only one key which he could use both privately as well as in his company, and even possibly in public institutions (hotel rooms, etc.) without any such restrictions. The afore-cited possibilites of the simple production and elimination of a key fitting function which cannot be forged, the latter of which does not even require the existence of the respective key, opens up such perspectives. A variation of the method is possible in this context which will be explained in the following. The keys to be used contain a coded number each which differs from the coded numbers of the keys mentioned up to now in that they should never repeat if possible which, of couse, produces a higher number of digits. The associated lock means contain an address association register for recalling the associated lock memory/key memory cells. The key coded number, for example, as well as the address of the respectively associated key memory cell could be stored under the address of the associated lock memory cell in the address association register. Using a comparator assembly, the memory cell association can be ascertained automatically and subsequently produced during each key usage with the aid of an address counter. If a key which initially does not fit is made to fit with the aid of a proper central key for a lock according to this method variation, the associated key memory and lock memory cells are initially ascertained by independently recalling new lock memory and key memory cells continuously by means of the address counter which examines the contents of a gate circuit with respect to occupation or vacancy until a vacant memory cell has been found whose addresses are then associated in the address association register with the code number of the respective key. However, if the functionability of a key is eliminated with respect to the respective lock with the aid of the proper central key, both the associated address association register cell and the recallable, associated lock memory and key memory cells will be erased and thus released for new uses.

Apart from these method variations, it is also possible in accordance with the invention to register the code numbers of the last key used in the lock electronic system or in an externally connectable auxiliary means in the correct sequence and to display them. In so doing, the respective time can be determined and recorded in the registration using a time and date means. This form of supervision by the user cannot be forged or imitated, since an intentional change of the code number of the key to be used with the intention of triggering a misleading registration must necessarily produce a false memory cell associated so that even an originally proper key will have lost its fitting function.

It is desirable to exchange the data between the lock and key in series in order to reduce the required key contacts and thus the resultant sources of error, e.g. due to oxidation, dirt, etc. The necessary parallel/series converters and series/parallel converters must be inserted into the lock and key circuits. A special application for the serially organized data exchange is the operation of specially separate key/lock means which requires suitable transmission means to be interposed therebetween.

In order to increase safety, additional measures can also be taken in the present method which have already proved themselves in other means. Mention should be made of the required use of at least two proper keys to trigger a release, or the externally triggerable blocking of the release arrangement which is also supposed to exist for proper keys for the duration of the external drive. Such a blocking or inhibition control could then automatically de-energize the driven lock means at predetermined times of the day and night by using a pre-settable switching clock, for example.

In order to accomplished further objects of the invention and especially improve the hitherto recited method, an emergency code can additionally be stored in the lock electronic system which is read into the present lock memory cell in place of the variable code automatically if disruptions occur or upon recall in case of misuse.

Such a disturbance occurs, for example, if a safe protected by this method has been heated so severely by the use of a cutting torch that the code stored in the lock memory is destroyed. Consequently, these have assumed a technologically conditional preferential state (all code elements: logic 0 or all logic 1). It would thus not suffice to overheat an improper key in order to produce corresponding code coincidence and thus to make the key fit.

In order to prevent this, the means for examining the coincidence of associated lock and key does in the presence of a code showing no logical change identify this code as being non-coincident and, if desired, initiate the read-in of the emergency code into the present lock memory cell.

The code examination necessary hereto can occur by a comparator being supplied once by a code directly and once by a code shifted in one position. If the comparator identifies coincidence for all code positions then this code is showing no logical change.

In order to safeguard against internal disruptions of function, monitoring means are provided within the lock electronic system which monitor the function progress and interrupt the current program if errors occur and, if desired, initiate the read-in of the emergency code into the present lock memory cell.

There is always danger of misuse when a key has been lost. In such a case, a proper replacement key can be produced immediately from a standardized key with the aid of the central key, thereby rendering the lost key automatically functionless due to the released new code. It is more problematical, however, if the proper central key has been lost or stolen, since with the aid of this central key proper keys can be produced from standardized keys. In order to prevent misuse in such a case, the user has the possibility in accordance with the invention of rendering the lost or stolen proper central key immediately functionless by using an improper central key (e.g. standardized central key.) Means are provided in the lock electronic system which recognize the use of an improper central key and cause the emergency code to be read into the lock memory cell associated with the central key.

The resultant read-in of the emergency code into the lock memory cell associated with the central key makes it possible for only the manufacturer or an authorized person to manufacture a proper replacement central key, since the emergency code which is valid for each associated lock must be read into the replacement central key. The different emergency codes, however, are known to these persons only. Due to the resultant fitting function of the replacement central key for all associated locks, it is sufficient if each lock has been actuated once before the replacement central key is handed out, since all emergency codes have thus been replaced by variable codes, thereby guaranteeing the secrecy of the emergency codes. It should be noted that the emergency code should be removed from a separate memory on the lock side whose contents are not changed due to heat action.

It is desirable for specific applications to be able to subsequently reconstruct the respective time the emergency code was read in. It is expedient for this purpose that the emergency code have a variable code segment which is not subject to the release comparison examination, the variable code segment being charged by a time and/or date generating means which identifies the time at which the emergency code is read in.

In order to determine the time of use of a stolen or copied proper key, the variable code should also include a code segment which can be taken into account in the release comparison examination and which identifies the time of its release. In order to evaluate these data, it is necessary that means known per se be provided which initiate the recall of the code segments containing the times and their evaluation by display and/or registration.

The use of a central key makes it possible for the user to produce and vary at any time the association of a plurality of keys and locks. There are applications in which no central keys are supposed to be used. So that the operation can be performed in these using variable codes and so that lost or stolen keys can be "blocked" and replaced at short notice, the lock electronic system according to the invention is designed such that the means for examining the coincidence of the associated lock and key code identify the key as proper for every use both in the case of a coinciding variable code provided on the key side and in the case of the emergency code which is provided as a replacement therefor. Each key can be made proper in this way by charging its associated memory cell with the emergency code (e.g. on the manufacturer's side) valid for the respective lock. Every such lock electronic system responds in all cases to the proper emergency code and replaces this by a coinciding variable code. Hence, this key still fits and cannot reveal the emergency code if lost.

Since it cannot always be ensured that the emergency code will remain secret, the possibility is provided in a further development of the invention to vary the emergency code at predetermined time intervals upon request or even as a precaution. This requires that the memories to be used to accommodate the emergency code or a corresponding safeguarding code are variable as far as their contents are concerned.

Such a code variation can be effected by reading in the respective emergency code or safeguarding code to be used or a code to be used for the derivative thereof with the aid of a data medium which withdrew this code out of a separate means. So that the demanded secrecy of this code is safeguarded, it is meaningful to communicate, instead of the actual code, a control code used for the derivation thereof which is then converted preferably within the lock electronic system into the desired code. It must also be safeguarded that the person requesting this code is authorized to obtain it. It is expedient for this purpose that the data medium is a key whose credentials are examined before the code to be transmitted is recalled and that for this purpose the respectively valid key code is variable during each code recall. Other functionally corresponding means, e.g. magnetic cards, may also be used instead of keys.

Another method of code transmission would consist in that the input of the emergency code or safeguarding code to be used or a code to be used for the derivative thereof is effected through electrical lines or by wireless transmission and that additional code converters can be used for this purpose.

The code converters, whose mode of operation is known per se, are intended to prevent misuse from becoming possible by "intercepting" the transmitted code. The same also applies to the remote input of the credential code.

In order to prevent the misuse of proper keys by duplicating their valid codes, the key code to be considered in the comparison is formed with the lock code produced in a similar manner not until it is output on the key side by a key-internal logic gate of at least two component codes stored on the key side, as well as another component code which can be supplied externally. The latter is supplied to the key electronic system by the lock electronic system in synchronism to the code output. In so doing, it is important that at least one of the component codes stored on the key side as well as the externally suppliable component code are variable. They should be changed during every use. The key-internal connection of the component codes stored in the key prevents the determination thereof on the basis of the resulting output code. Knowledge of the individual component codes stored on the key side, however, is necessary for duplicating a proper key with the appropriate function, since to form the correct key code, these component codes are linked differently with the external component code which is supplied to the output in synchronism. A prediction of the valid key code is thus only possible if the component code to be supplied externally is known. Due to its change which automatically occurs every time there is a recall, it is futile to prematurely recall this for purposes of duplicating it.

BRIEF DESCRIPTION OF THE DRAWINGS

The invention is illustrated in the drawing and will be explained in the following with reference to an embodiment. In the drawing.

DESCRIPTION OF PREFERRED EMBODIMENT

Figure 1:
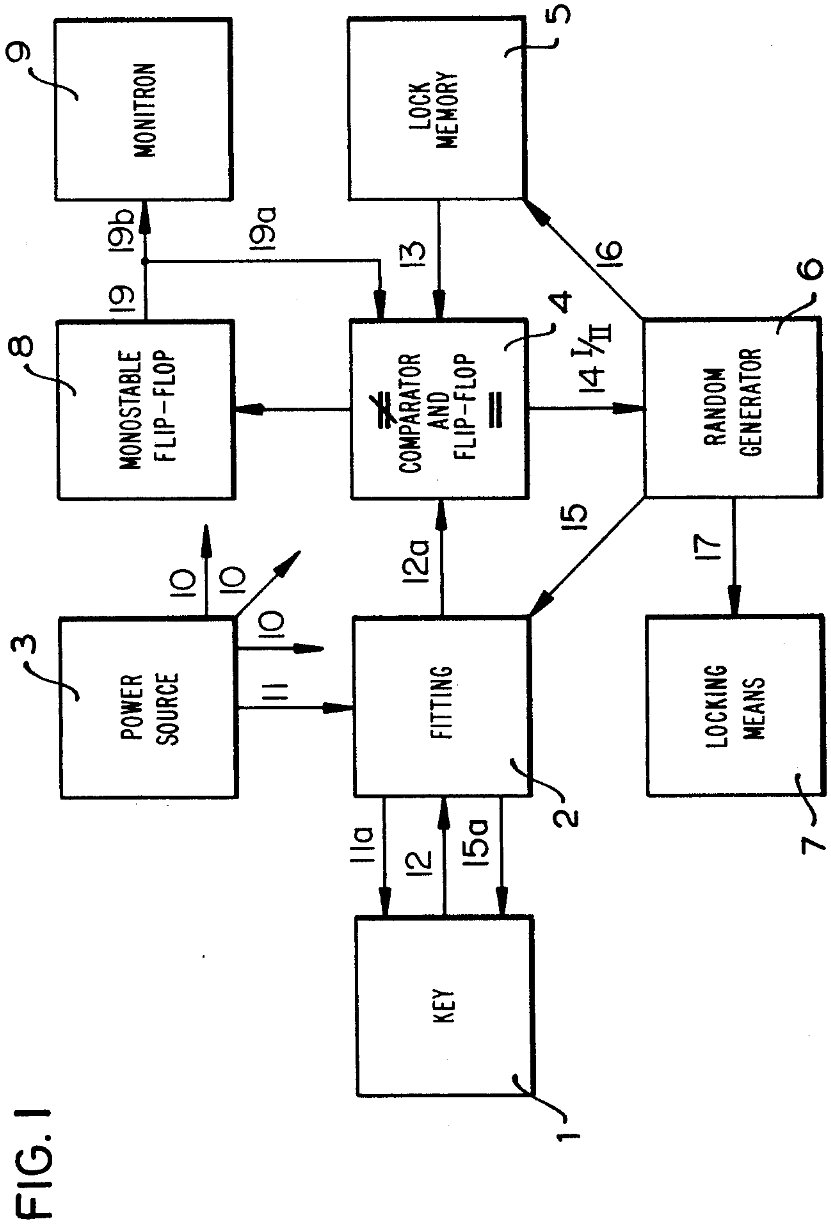
FIG. 1 is a block diagram of a lock electronic system connected to the key electronic system.

Referring to FIG. 1, the key 1 is inserted into the fitting 2 and obtains the required operational voltages through this over connection **11*a* from the power source 3 which is buffered against current failure and which also supplies over connections 10 the lock electronic system with current. The key through its fitting 2 supplies over data connections 12, 12*a* its code to a digital comparator 4 which cooperates with a monostable flip-flop which is functionless during normal operation. The associated code from the lock memory 5 is also supplied over data connection 13 to the comparator 4. If the two codes coincide, the comparator 4 addresses over connection 14I/II a random generator 6 which produces a new code and reads this over data connection 15, 15*a* into the associated memory cell of the key 1 via the fitting 2 as well as over data connection 16 into the associated memory cell of the lock memory 5. Thereafter, the random generator 6 produces over connection 17 a release signal and supplies this to the electromagnetic locking means 7 which is thereby released to unlock. However, if the digital comparator 4 reports over connection 18 the non-coincidence of the codes offered to it, it then actuates a monostable flip-flop 8 for a predetermined time interval, e.g. 3 minutes. The corresponding flip-flop signal of the flip-flop stage 8 inhibits over connection 19,19*a* the comparator 4 as long as it is present to protect the system from other possible attempts to ascertain the valid code and at the same time triggers over connection 19,19*b* an alarm through the alarm apparatus 9** (monitron).

If an orginally improper key is to be rendered proper with the aid of the proper central key, the central key must first be inserted into the fitting 2. It is manipulated like a normal key in the same manner as already described above. The automatic assocation of that lock memory cell which is valid for the central key is effected according to the description pertaining to FIG. 3. The central key, after having been inserted into the fitting 2, then produces over connection 12,12a an additional identification signal which identifies it as the central key. This identification signal activates the monostable flip-flop stage of the comparator 4 which, however, is not set until the digial comparator has reported coincidence of the central key code with the associated lock code. The monostable flip-flop stage of the comparator 4 can thus be set only by a proper central key. After expiration of its predetermined time interval—e.g. 30 sec.—it again returns to its original state, thus establishing the old operational stage once again. For the duration of the given flip-flop state of the monostable flip-flop of the comparator 4, the flip-flop signal ensures that the comparator 4 will produce over connection 14I only the signal reporting coincidence after examination of the code, irrespective of the actual results of the examination. A signal is only formed if a proper key is introduced during the existent state of the monostable flip-flop. The signal on connection 14II causes the random generator 6 to issue the new code to the lock memory 5 only over connection 16. As a result, an improper key inserted subsequent to the proper central key will be treated like a proper key by providing the associated memory cells with a new coinciding code from the random generator 6 through data connections 15/15a and 16. This key then fits the present lock as well, while any other subsequent inserted proper key will be blocked due to a unilateral code change (which occurred in the lock).

Figure 2:
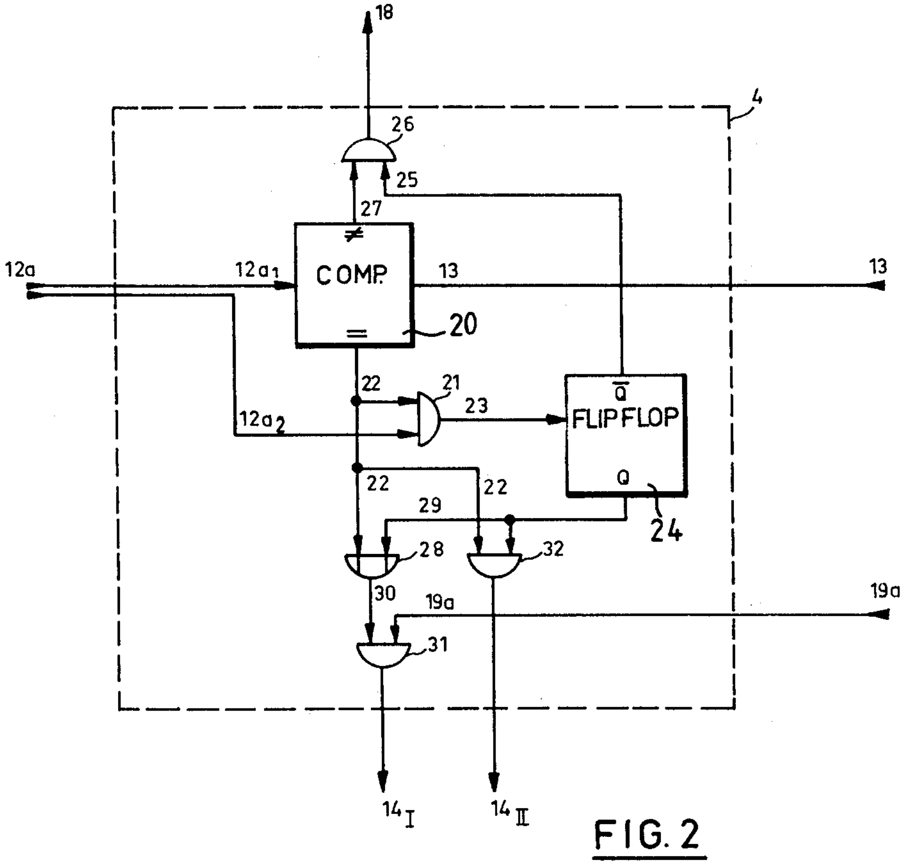
FIG. 2 is a circuit arrangement of the block 4 in FIG. 1.

Referring to FIG. 2, the circuit 4 according to FIG. 1 contains a comparator 20 and a monostable flip-flop 24 as well as the logic circuit elements required to execute the afore-described coordinated work. The data connection 12a comprises both lead branches 12a1 and 12a2. The branch 12a1 transfers the key code to the comparator 20, while the branch 12a2 transmits the identification signal of a central key to an AND gate 21. The comparator 20 compares the key code supplied to branch 12a1 with the associated lock code supplied by connection 13. According to the arrangement of the circuit, the data can be transmitted in parallel or in series and/or processed in this way. If the codes coincide, the comparator 20 supplies an identification signal to the AND gate 21 over connection 22. If an existent central key is also announced via branch 12a2, the AND gate 21 supplies a signal to the monostable flip-flop 24 over connection 23 which has a defined duration (e.g. 30 sec.). During this interval, an improper key to be inserted subsequently can be transformed into a proper key. The inverse flip-flop signal from the monostable flip-flop 24 is conveyed over connection 25 to an AND gate 26 which is thus rendered inactive for the duration of the actuated state of the flip-flop 24. In addition, an AND gate 26 is also supplied with a signal from the comparator 20 over connection 27 whenever the comparator 20 determines non-arrangement of the compared codes. As a result, the announcement of the existence of an improper key issued over connection 27 is not conveyed to the output lead 18 of the gate 26 as long as the monostable flip-flop 24 is energized. The comparator signal supplied to the connection 22 which announces code arrangement is always conveyed via an OR gate 28 to its output lead 30. If the monostable flip-flop 24 is energized, it supplies an output signal to the OR gate 28 which, irrespective of the result of the code comparison made by the comparator 20, thus prepares in its output lead 30 a signal which is conveyed via an AND gate 31 to the connection 14I, providing that the AND gate 31 is activated over connection 19a. This is always the case if no alarm exists, thus also implying that, if an alarm does exist, no signal can be conveyed over connection 14. An AND gate 32 is also supplied over connections 22 and 29 with the same signals as the OR gate 28. The AND gate 32 thus only supplies a signal to the connection 14I when both the monostable flip-flop 24 is energized and when a proper or fitting key exists.

Figure 3:
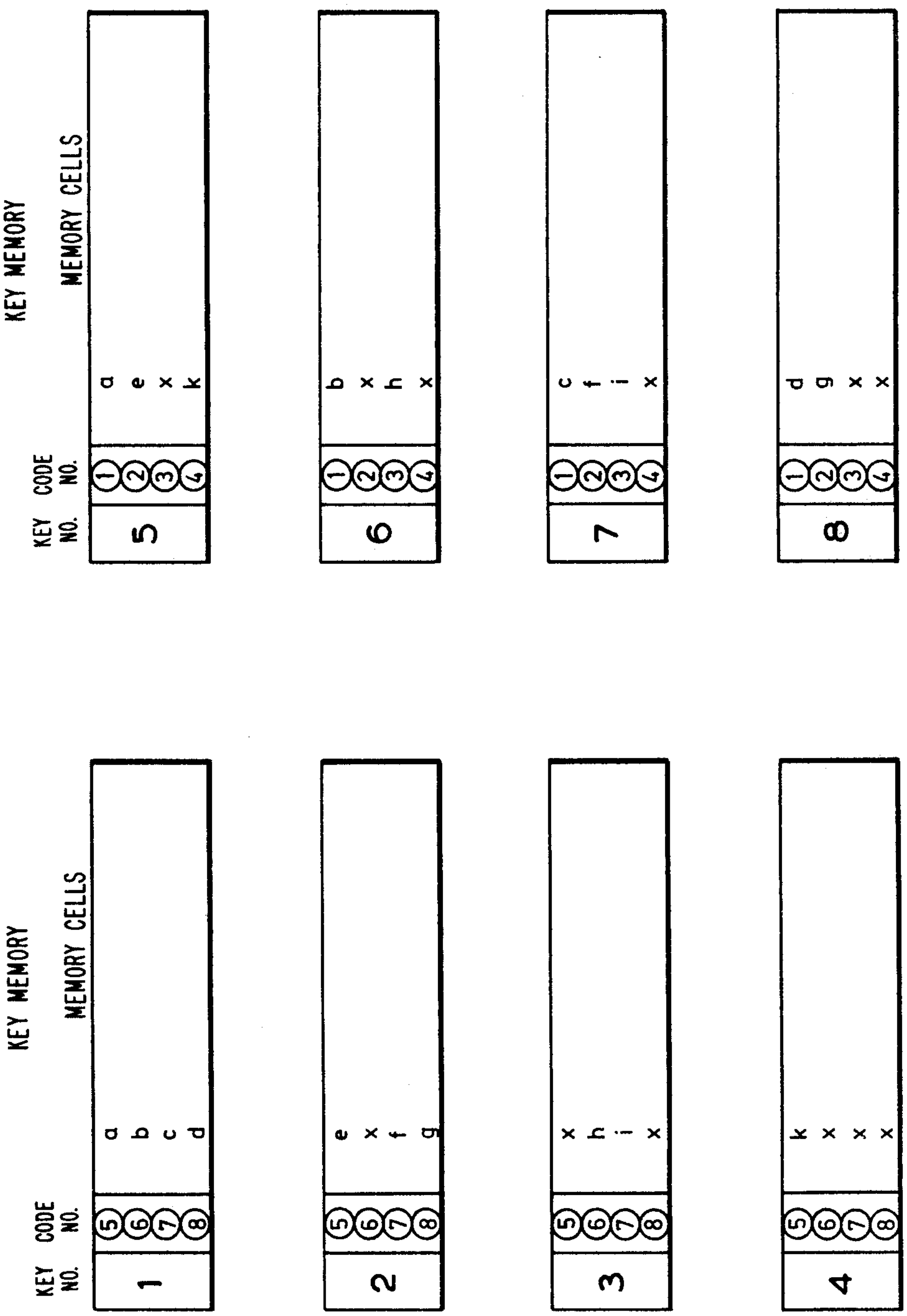
FIG. 3 is a block diagram to illustrate the memory organization of four keys and four locks with individual association.

Referring to FIG. 3, each key and each lock contains its own erasing and read-in memory arrangement which retains the stored information even without an applied operating voltage, e.g. a so-called EAROM (electrically alterable read only memory). In the present embodiment, each memory arrangement is to have four addressable memory cells with 16 bits apiece as well as a memory cell (shown at the left of each memory arrangement in FIG. 3) with its own stored code number (1–4 and 5–8). If a key is inserted into a lock, the code number of the key is used to address the lock memory and the code number of the lock is used to address the key memory. Consequently, each key and each lock have another combined pair of memory cells which is automatically called when a key is inserted into a lock.

The individual memory cells each contain a code word with 16 bits. If the key and lock fit one another, the code words of the associated memory cells must always contain the same bit pattern. In the present embodiment, key 1 is supposed to fit locks 5, 6, 7, 8 key 2 is supposed to fit locks 5, 7, 8 key 3 is supposed to fit locks 6, 7 key 4 is supposed to fit lock 5.

The individual bit patterns are characterized in FIG. 3 by the letters a to k. Like bit patterns are designated by like letters. All memory cells in which an x is found do not coincide with the associated bit pattern. It is assumed first of all that the user has made the key/lock associations as shown in FIG. 3 with the aid of a proper (fitting) central key.

The coinciding 16 bit code words of the respectively called, combined key and lock memory cells are replaced by two new 16 bit code words which also coincide when a lock has been actuated with a proper key. Consequently, the code combinations change continuously without a change in the originally determined association occurring.

Figures 4A, 4B, 4C:
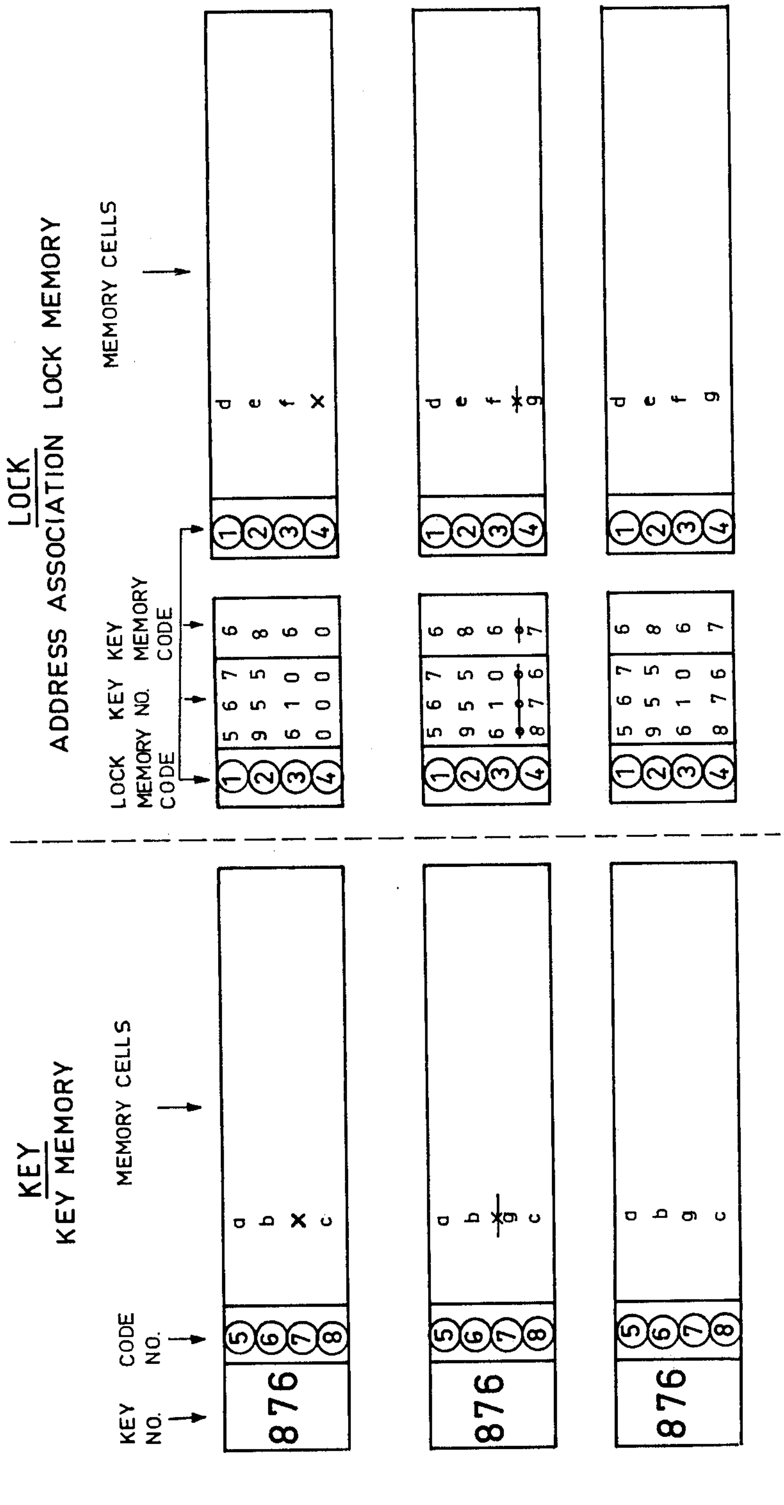
FIGS. 4A, 4B, 4C are block diagrams to illustrate the memory organization for a modified embodiment including a key associated with no "lock family" and an appropriate lock electronic system for three operational modes.

Referring to FIGS. 4A–4C the key memory in this embodiment contains four addressable memory cells (5–8) for receiving four different key codes. The key can thus actuate a maximum of four different locks with codes which vary in a series. The memory arrangement of the lock consists of an address association register and a lock memory. In the present invention, the memory arrangements on the lock side contain four addressable memory cells (1 to 4) each, thus permitting access to a maximum of four keys. In the arrangement selected in this case, address association registers and lock memories are always addressed in the same manner, thus allowing them to be combined with one another. FIG. 4A illustrates the memories into which an initially improper key with the electronically stored identification number 876 and a lock have been occupied. Those key memory cells which are already occupied for other locks, each contain a key code a, b and c, while the unoccupied key memory cell 7 is still available as characterized by the latter x. The occupied lock memory cells 1, 2 and 3 each contain a lock code d, e and f for other keys. The lock memory cell 4 is not occupied and is thus still available as characterized by the x. All associations relating to the lock are inside of the address association register. For example, the lock code d of lock memory cell 1 belongs to key No. 567 whose key code d is contained in the key memory cell 6.

If an improper key is connected to the lock according to FIG. 4A, an address counter on the lock side calls all four memory cells of the address association register in succession, while a comparator compares the key identification numbers stored therein with the existing key identification number (876). Since agreement is not forthcoming in any case, the inserted key remains functionless. However, if a proper key is used according to FIG. 4C the comparator announces coincidence of the key identification numbers after the cell 4 of the address association register and thus the lock memory have been addressed, stopping the address counter, thus preparing the lock code g by the lock memory cell 4. The key memory address 7 stored under this address 4 in the address association register is supplied to the inserted key for addressing, thus causing this to supply the key code g which is compared with the lock code g by a comparator on the lock side. The evaluation of the results of comparison correspond to that already described for FIG. 1 by forming a new coinciding code pair with the aid of a random generator only if there is agreement and printing this into the addressed lock and key memory cells as new g codes, whereupon the lock is released.

If the fit of a key has to be altered either by making an improper key proper or a proper key improper, the central key must initially be inserted into the respective key fitting. First of all, it is examined and checked like any other key in the afore-described manner and is identified only if the permissible key identification number and the key code agree as far as the marking is concerned as described for FIGS. 1 and 2, whereupon it triggers a brief functional reorganization of the lock electronics via a monostable flip-flop, thus ensuring that a key subsequently introduced will be changed as far as its fit is concerned as well. If this happens to be an originally improper key which is to be rendered proper, the address counter/comparator assembly on the lock side locks for an unoccupied cell in the address association register and thus in the lock memory as well (cell 4 in the present example according to FIG. 4A). This is achieved by erasing the existent key identification number at the comparison input of the comparator. Similarly, an unoccupied key memory cell (cell 7 in the present example according to FIG. 4A) is also called whose address (7) together with the key identification number (876) is registered in cell 4 of the address association register which is called on the lock side. With the aid of the random generator, a coinciding code pair (g) is now entered in the called key and lock memory cells according to FIG. 4B. The key fits this lock in the future.

On the other hand, if the key whose fit is to be varied is an originally proper key, this triggers first of all the normal functions described at the outset with reference to FIG. 4C by calling the associated key and lock memory cells and thus those of the address association register. If this happens, the contents of all called cells is erased, thus preparing these for new occupations.

Figure 5:
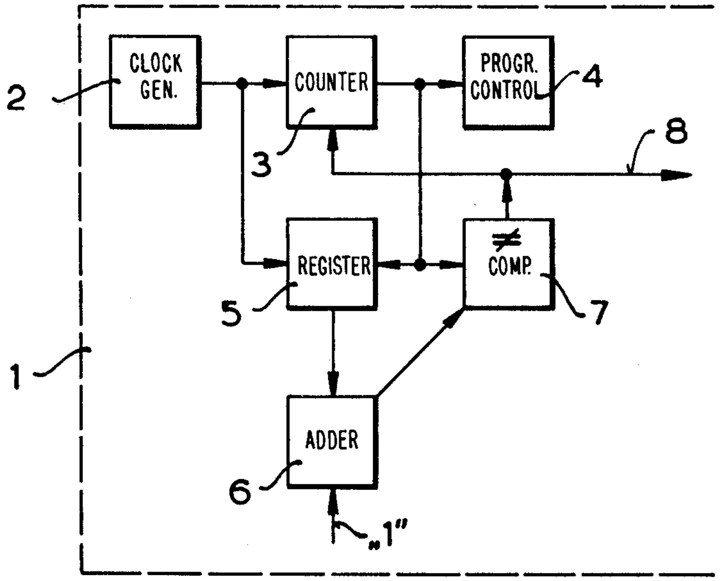
FIG. 5 is a block diagram of part of the lock electronic system for monitoring the program control and for interrupting the program if errors should occur.

The part of the lock electronic system 1 illustrated in FIG. 5 contains a clock generator 2 which supplies a program step counter 3 which in turn initiates the correct sequence of the release of the individual steps of a program control 4. Monitoring ensures that there is continuous surveillance of whether or not the counter 3 is operating perfectly, i.e. that no counters are skipped. This is effected by storing the last respective count in a register 5 in synchronism with the cycle, but delayed by one step. The contents of this register thus constitutes the preceding count. It is supplied to an adding machine 6 which increases this count by continuously adding "1". The current count which is thus reconstructed in this way is supplied by the adding machine 6 to a comparator 7 which compares it with the count of the counter 3. If there is no agreement, the comparator 7 generates a comparator signal 8 which characterizes this state and which resets the counter 3 to its initial position, thus causing the premature interruption of the program. This comparator signal 8 can also be used to trigger the read-in of the emergency code into the lock memory.

Figure 6:
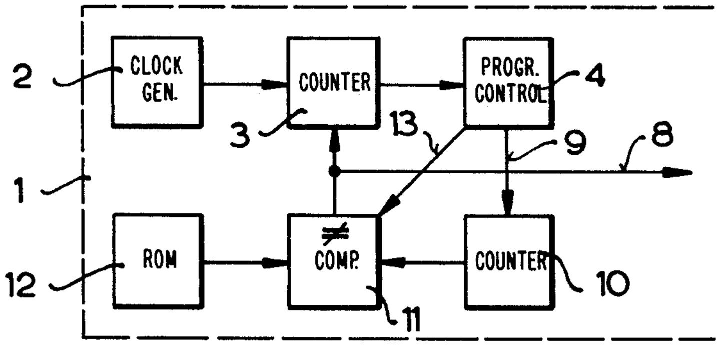
FIG. 6 is a block diagram of a modified embodiment of this part of the lock electronic system.

Another method of monitoring the perfect functioning within the lock electronic system is shown in FIG. 6.

The program control 4 is driven in the same manner as in the embodiment of FIG. 5. The control signals 9 arriving at the output from the program control 4 are registered in a counter 10 according to the number of logical signal changes. At the end of the program, the counter 10 must have a pre-defined count. This is then compared in a comparator stage 11 with the predetermined value of a ROM 12 at the end of the program. The decisive time is indicated by an output signal 13 of the program control 4 so that the output of the comparator signal 8 cannot be effected until after the completion of the program. If this occurs, it then assumes the same control functions as the comparator signal 8 produced according to the embodiment of FIG. 5.

Figure 7:
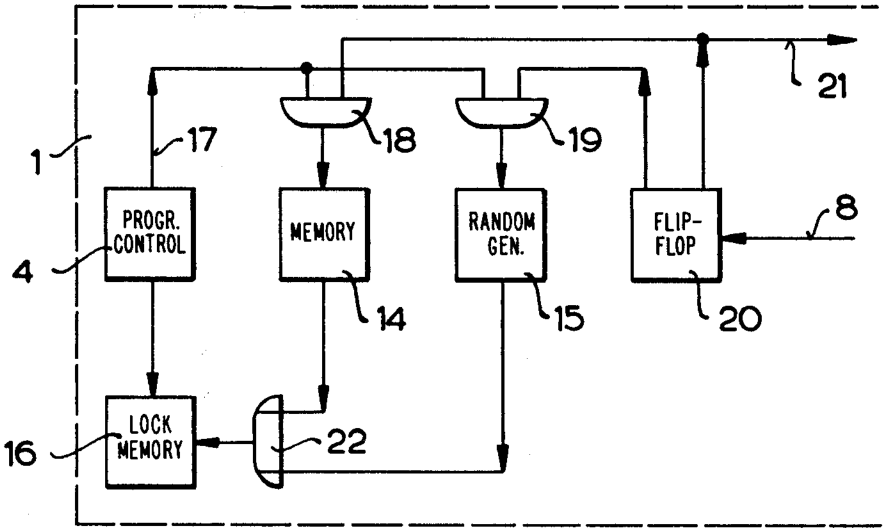
FIG. 7 is a block diagram of part of the lock electronic system which initiates the read-in of a secret emergency code into the lock memory.

FIG. 7 illustrates how the emergency code of a memory 14 can be read into the lock memory 16 instead of the variable code of a random generator 15 with the aid of the comparator signal 8 or a control signal used to trigger the same function, e.g. the control signal characterizing the use of an improper central key. At the time of desired read-in of the new code, the program control 4 generates a control signal 17 which is supplied to two AND gates 18 and 19. If the current program is a program repetition due to the formation of a comparator signal 8, then a flip-flop stage 20 connected to the AND gate 19 has already been replaced by the comparator signal 8. In its set state and with the aid of its output signal 21, the flip-flop stage 20 ensures that, in the case of a program repetition, the renewed formation of the comparator signal 8 would no longer result in program interruption so that a new code is guaranteed. Moreover, it releases the AND gate 18 and inhibits the AND gate 19, thereby causing the emergency code of the memory 14 to be read into the lock memory 16 via an OR gate 22 instead of the variable code of the random generator 15.

Figure 8:
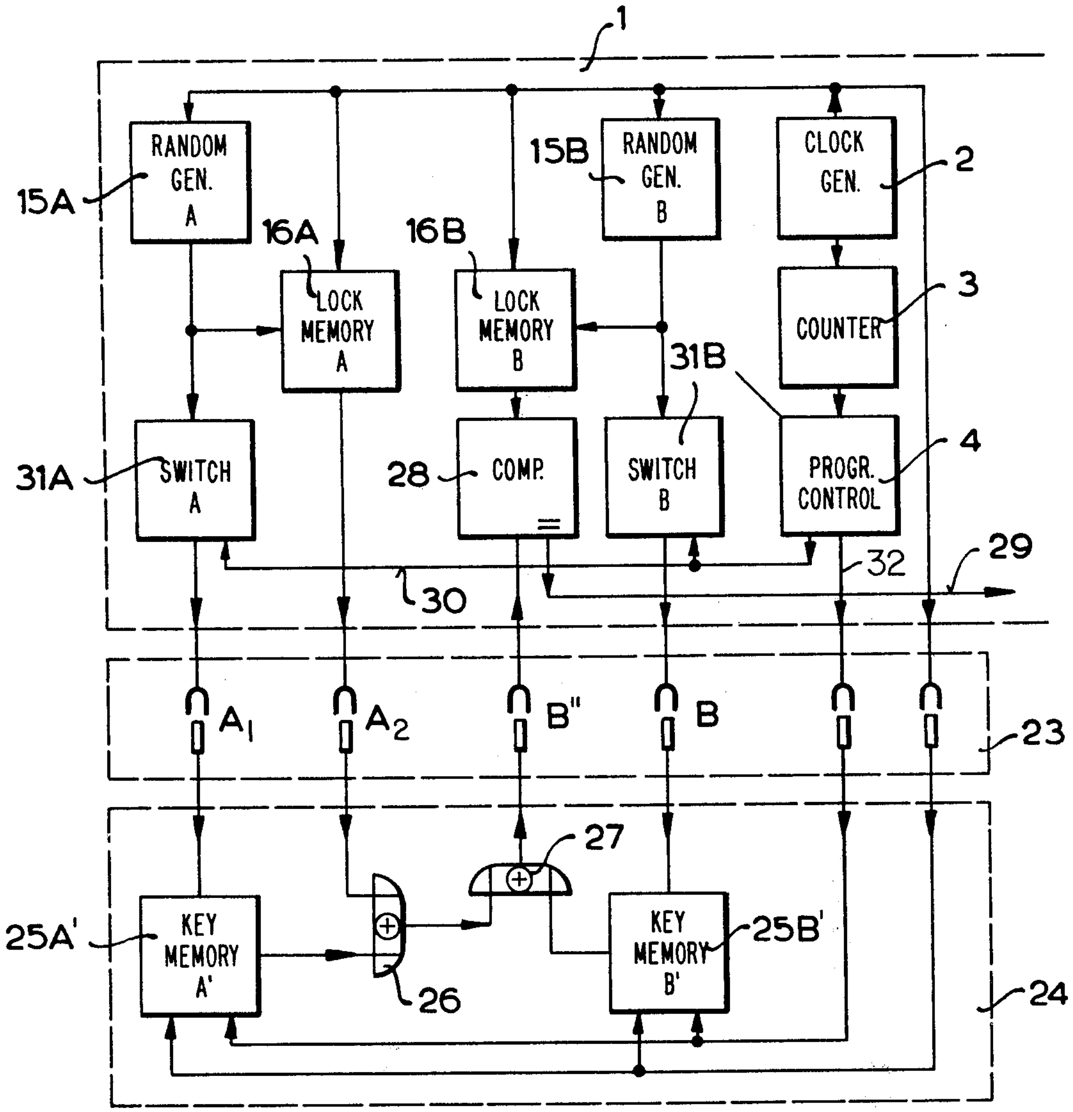
FIG. 8 is a block diagram of the lock electronic system connected to the key electronic system including a circuitry to prevent incompetent read out of the key code.

As shown in FIG. 8, the lock electronic system 1 communicates with the key electronic system 24 through a plug connection 23.

Two different, independent codes A and B are used. These are automatically changed during every use via the lock electronic system 1. The B code which is stored both in the lock memory 16B as well as in the key memory 25B′ if the key is proper and fits is the code responsible for the actual examination of the fitting function of a key. A genuine read-out of the B″ code from the key electronic system 24, however, is only possible if the $A_2$ code is synchronously supplied to the key electronic system 24 for a serial read-out operation. The A code is stored both in the lock memory 16A and in the key memory 25A′ if the key fits. If the $A_2$ code is synchronously supplied to the key electronic system 24 during the read-out operation on the key side, this $A_2$ code induces an EXCLUSIVE OR gate 26 to supply a logical 0 to the second input of an EXCLUSIVE OR gate 27 for the duration of the read-out operation only if the $A_2$ code coincides with the output code of the key memory 25A′. Consequently, the EXCLUSIVE OR gate 27 genuinely discharges the B″ code on the key side. A digital comparator 28 in the lock electronic system 1 compares the B″ code of the key electronic system 24 supplied to it with the B code of the lock memory 16B and produces a release control signal 29 only in case of coincidence.

Since the codes A and B are varied automatically during every use, there is no possibility of recalling the A code without changing it by the lock electronic system in an attempt to utilize it to be able to genuinely read out the B″ code from the key electronic system 24, thereby thwarting such an attempt to copy it.

The two random generators 15A and 15B take over the production of the codes A and B. These generators are synchronized with the clock by the clock of generator 2. The same applies as well to the read-out of codes A and B from the lock memories 16A and 16B. In order to continue to ensure the clock-controlled processing of codes within the key electronic system 24, this is also supplied with the clock of the generator 2. The coordination of the individual function operations is effected by the program control 4 by means of which the electronic switches 31A and 31B are also interrupted with the aid of a control signal 30 in order to prevent a read-out of the new codes A and B after the presence of an inproper key has been detected. This ensures that an improper key will continue to be improper.

However, in the presence of a proper key the electronic switches 31A and 31B remain closed also after comparing the codes enabling the new codes $A_1$ and B to be supplied to the key memories 25A′ and 25B′. The program control 4 generates a signal 32 indicating acceptance and enabling the key memories 25A′ and 25B′ simultaneously to take over the codes $A_1$ and B.

Figure 9:
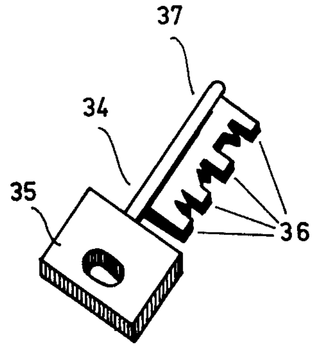
FIG. 9 is a pictural view illustrating a typical key configuration embodying the invention.

As shown in FIG. 9 the key 34 is of usual key design and is arranged for an electrical coupling by contact elements. The key electronic system is installed into the key handle 35 whereas the contact elements 36 are located at the protruding ends of the key-bit 37 and are embedded insulated. As usual, the lock comprises a key fitting being mechanically proper to the key-bit 37 and having corresponding lock contact elements. The electrical contact occurs, however, when the inserted key has been twisted in the fitting in order to ensure that only a mechanical proper key can be coupled electrically with the lock electronic system. This gives a further protection, e.g., against malicious damage of the lock contact elements. The key can also have a switch function for starting power supply at the lock side. For this purpose two pairs of contact elements are additionally provided at the key side being internally connected with one another. Thus, only by use of a mechanically proper key the lock electronic system can be switched on.

Various modifications may be made in the above key construction without departing from the scope of the invention. For example, the key can be designed as a plug or as a card.

We claim:

1. An electronic security system comprising:

at least one key having at least one binary code stored in memory cells therein;

a central key having at least one binary code stored in memory cells therein and also additional information indicative of its character as a central key;

and at least one electronic lock for use with said keys and comprising:

a locking means actuatable to unlocked condition;

a lock memory having at least two binary codes stored in memory cells therein;

a comparator for comparing a code in said key memory and a code in said lock memory when the key is presented to the lock and for providing a signal indicative of coincidence or non-coincidence between said codes, said comparator including an inhibitor stage actuatable by a proper central key;

a random generator operable in response to the signal indicative of coincidence from said comparator to provide new coincident codes for said key memories and said lock memory and subsequently to actuate said locking means;

said comparator being further operable upon coupling said central key with said lock to enable said random generator after the central key is identified as a proper central key within a predetermined interval of time to provide a signal indicative of coincidence to be actuatable to provide new codes to said key and/or to said lock, when a subsequent key is coupled with said lock, whereby said lock and a key provided with an original non-coincident code can be provided with a new coincident code, whereas a key provided with an original coincident code is rendered non-coincident and unusable by one-sided feeding of the new codes or by erasing the present codes in the key or in the lock.

2. A system according to claim 1, wherein said random generator is operable in a manual mode and wherein the binary code combination is varied by manual actuation after the proper key has been inserted into the lock.

3. A system according to claim 1, wherein the memory cells contained in the lock and keys consist of a plurality of addressable storage cells, each of which is capable of receiving another code combination, and that when a plurality of locks and keys are used, another pair of associated storage cells are selected for each lock/key combination due to their different identification.

4. A system according to claim 1 wherein each lock and each key has a stored individual identification in the form of a coded number, and that the code number of a lock constitutes the same constant address of the associated memory cells of all permissible keys, and that the code number of a key constitutes the same constant address of the associated memory cells of all permissible locks.

5. A system according to claim 4, wherein to eliminate the functionability of a key with respect to the existant lock after the released reversal of the fitting function, the contents of the associated address association register cell are erased in addition to the contents of the associated lock memory and key memory cells registered therein.

6. A system according to claim 1 wherein the code numbers of the last used keys are registered, indicated and/or read out in the correct sequence by a memory unit which is connected to said lock.

7. A system according to claim 1 wherein to reduce the required lock and key contacts the data transfer is executed serially by parallel/series converters or series/parallel converters.

8. A system according to claim 1 including an electronic counter which is supplied with counting pulses from a pulse generator to determine the duration of time of closure if locking is effected by said locking means and including means for releasing said locking means for unlocking if a proper key is used, only after the count has been erased from said counter.

9. A system according to claim 8 wherein the electronic counter is designed as a forward-backward counter and the count is erased by a contrary count, and means for providing counting pulses for said contrary count, said means being operated by a coin insertion apparatus which relates the value of the inserted coins to a corresponding number of pulses.

10. A system according to claim 1, wherein means are provided which inhibits an external selection unit from effecting release of the locking means both for proper as well as for improper keys.

11. A system according to claim 1, wherein said lock includes a key socket and wherein said central key is adapted to be inserted into an additional socket provided therefor for another reversal of the fit function of yet another key.

12. A system according to claim 1, wherein a time stage is provided in the lock by means of which the reversal of the fitting function of a key to be exchanged for the central key and to be reversed in its fitting function is released briefly.

13. A system according to claim 1 wherein each lock and each key has stored individual identification in the form of a coded number, and that the coded number initiates through an address association register the recall of associated lock memory/key memory cells.

14. A system according to claim 13, wherein to produce the functionability of a key relative to the present lock after released reversal of the fitting function for the purpose of detecting the memory cells which are as yet still vacant and associated with one another in addition to the addresses for the lock and key of said memory cells, at least one address counter and at least one gate means is provided in said lock to detect the occupation or vacancy of the associated memory cells, the address counter continuously recalling new memory cells until the associated gate means reports the detection of a vacant, useful memory cell.

15. A system according to claim 1, wherein the locking means is not released when there is coincidence of the lock and key codes until said comparator indicates the coincidence of the new code combinations read into the associated lock and key memory cells, and that, if the codes do not coincide, the random generator replaces the codes by two new coinciding code combinations until the comparator indicates coincidence of the code combinations.

16. A system according to claim 1, wherein a secret emergency code is additionally stored in said lock memory which is automatically read into the lock memory cell in place of the variable code if disruptions occur or upon recall in case of misuse, and that in the key, the key code which reaches the output and which consists of at least two component codes stored in the key and an externally suppliable component code is formed by the logical linkage thereof, this code being compared with a code correspondingly produced in the lock.

17. A system according to claim 16, wherein monitoring means are provided in said lock which monitor the function progress and interrupt the current program if errors occur and, enabling initiation of the read-in of the emergency code into the present lock memory cell.

18. A system according to claim 16, wherein means are provided in said lock which recognize the use of an improper central key and cause an emergency code to be read into the lock memory cell associated with the central key.

19. A system according to claim 16, wherein the emergency code has a variable code segment which is not subject to the release comparison examination.

20. A system according to claim 19, wherein the variable code segment is charged by a time generating means which identifies the time at which the emergency code is read in.

21. A system according to claim 20 wherein means are provided which initiate the recall of the code segments containing the times and their evaluation by display.

22. A system according to claim 16, wherein the variable code includes a code segment which can be taken into account in the release comparison examination and which identifies the time of its release.

23. A system according to claim 16, wherein the means for examining the coincidence of the associated lock and key code identify the key as proper for every use, both in the case of a coinciding variable code provided on the key side and in the case of the emergency code which is provided as a replacement therefor.

24. A system according to claim 16, wherein the memories to be used to accommodate the emergency code or a corresponding safety code are variable with respect to their contents.

25. A system according to claim 24, wherein the input of the respective emergency code or safety code to be used or a code to be used for the derivative thereof is effected with the aid of a data medium which extracts this code from a separate means.

26. A system according to claim 25, wherein the data medium is a key whose code is examined before the code to be transmitted is recalled and that for this purpose the respectively valid key code is variable during each code recall.

27. A system according to claim 24, wherein the input of the emergency code or safety code to be used or a code to be used for the derivative thereof is effected through electrical lines or by wireless transmission and including additional code converters for this purpose.

28. A system according to claim 27, wherein at least one of the component codes stored on the key side as well as the externally suppliable component code are variable.

29. A system according to claim 24, wherein the release of the input of the respective emergency code of safety code to be used or a code to be used for the derivative thereof is effected through electrical lines or by wireless transmission and including additional code converters for the transmission of the code.

30. A system according to claim 1 including an alarm responsive to operation of said inhibitor circuit.

31. A method for operating a security system which includes at least one electronically codable releasable lock having a random generator therein, electronically codable keys, and an electronically codable central key having an additional identification information therein characterizing it as a central key, comprising the steps of:

providing said lock and said keys with binary codes;

coupling a key with said lock and determining whether or not the present codes are coincident and, therefore, whether the key is proper or improper;

employing said random generator to provide the coupled key and lock with new coincident codes, if said present codes are coincident and the key is proper and subsequently effecting release of said lock;

preventing provision of new coincident codes and preventing release of said lock, if said present codes are not coincident and the key is improper;

and coupling said central key with said lock to enable said random generator after identification as a proper central key and providing it with a new coincident code to be actuatable to provide new codes to said key and/or said lock, when a subsequent key is coupled with said lock, whereby said lock and an improper key provided with a present non-coincident code can be provided with a new coincident code and become a proper key, whereas an originally proper key provided with a present coincident code is rendered non-coincident and improper and unusable in said lock by one-sided feeding of the new codes or by erasing the present codes in the key or the lock.

32. A method according to claim 31 wherein after presentation of a key which is improper due to a non-coincident code, the evaluation of subsequently offered different key/code combinations is prevented for a predetermined interval of time.

33. A method according to claim 32, wherein after inserting of a key which is improper due to a divergent code, an alarm signal is provided.

34. A method according to claim 31, wherein during the determination of the coincidence of associated lock and key codes in the presence of a code showing no logical change and identifying this code as being non-coincident, and enabling initiation of the read-in of an emergency code into the present lock memory cell.

* * * * *

UNITED STATES PATENT AND TRADEMARK OFFICE
CERTIFICATE OF CORRECTION

PATENT NO. : 4,209,782
DATED : June 24, 1980
INVENTOR(S) : Norbert W. Donath et al It is certified that error appears in the above–identified patent and that said Letters Patent are hereby corrected as shown below:

In the drawings:

In Fig. 3, at the right side (above memory cells 5 to 8) the legend "KEY MEMORY" should read --- LOCK MEMORY ---.

Signed and Sealed this

*Seventh* Day of *October 1980*

[SEAL]

*Attest:*

SIDNEY A. DIAMOND

*Attesting Officer* *Commissioner of Patents and Trademarl*